United States Patent [19]

Wilke et al.

[11] 3,884,833

[45] May 20, 1975

[54] ZERO-VALENT NICKEL COMPOUND-AMINE CATALYST

[75] Inventors: Guenther Wilke; Paul Heimbach, both of Mulheim, Ruhr, Germany

[73] Assignee: Studiengesellschaft Kohle m.b.H., Mulheim/Ruhr, Germany

[22] Filed: May 11, 1972

[21] Appl. No.: 252,395

Related U.S. Application Data

[63] Continuation of Ser. No. 816,159, April 7, 1969, abandoned, which is a continuation of Ser. No. 582,224, Sept. 27, 1966, abandoned.

[30] Foreign Application Priority Data

Sept. 28, 1965 Germany.............................. 24437

[52] U.S. Cl.............. 252/431 N; 260/247; 260/577
[51] Int. Cl............................................. B01j 11/84
[58] Field of Search. 252/431 N; 260/563 R, 583 H, 260/677 R

[56] References Cited
UNITED STATES PATENTS

| | | | |
|---|---|---|---|
| 2,972,640 | 2/1961 | Burks et al...................... | 260/666 B |
| 3,277,099 | 10/1966 | Seibt et al....................... | 260/666 B |
| 3,323,902 | 6/1967 | Kroll................................ | 75/0.5 |
| 3,412,174 | 11/1968 | Kroll................................ | 260/683.9 |
| 3,428,699 | 2/1969 | Schleimer....................... | 260/669 |
| 3,475,395 | 10/1969 | Hsieh.............................. | 260/94.3 |

*Primary Examiner*—Paul M. Coughlan, Jr.
*Attorney, Agent, or Firm*—Burgess, Dinklage & Sprung

[57] ABSTRACT

A composition useful as an oligomerization catalyst said composition comprising at least one O-valent nickel compound and an amine of the formula

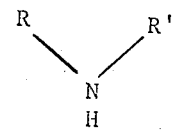

wherein R and R' are each selected from the group consisting of hydrogen, alkyl, cycloalkyl, aryl or R and R' are taken together with said N to form a closed ring.

4 Claims, No Drawings

ZERO-VALENT NICKEL COMPOUND-AMINE CATALYST

This is a continuation of application Ser. No. 816,159 filed Apr. 7, 1969, which is a continuation of Ser. No. 582,224, of Sept. 27, 1966, both abandoned.

In U.S. Patent Application, Ser. Nos. 532,900, filed Mar. 9, 1966, and 76520, filed Dec. 19, 1960, now abandoned, there has been described a process for the catalytic dimerization and trimerization, respectively, of 1,3-diolefins, in which catalysts are used which are produced by mixing carbon monoxide-free compounds of nickel with organometallic compounds such as metal alkyls, metal aryls or Grignard compounds, or with metal hydrides or with metal hydride complex compounds and electron donors. As electron donors, Lewis bases are used, such as cyclic ethers, tertiary amines, especially cyclic tertiary amines, alkyl or aryl phosphines, especially triphenylphosphine or alkyl or aryl phosphite, or compounds with a carbon-to-carbon multiple bond. Similar processes are claimed in German Auslegeschrift 1,126,864 of Badische Anilinimd Soda-Fabrik wherein the catalysts are made by reducing transitional metal compounds by means of metals (Al, Mg) and German Auslegeschrift 1,144,268 where certain nickel-(O) compounds are used as catalysts. It is furthermore known that butadiene can be transformed by means of catalysts, such as $(R_3P)_2Ni(CO)_2$, into mixtures of cyclooctadiene-(1,5) and 4-vinylcyclohexene, by the methods described in German Pat. No. 881,511 and in U.S. Pat. No. 2,686,209.

It is also known that, according to the Applicant's U.S. Pat. No. 3,088,985, 2,3-dimethylbutadiene-(1,3) can be transformed with the aid of typical Ziegler catalysts into an open-chained trimer, and specifically into a hexamethyldodecatetraene.

It is an object of this invention to provide a novel polymerization process and catalyst therefor.

According to this invention it has surprisingly been found that, when an excess of amines of the type

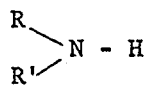

wherein R and R′ = H and/or alkyl, cycloalkyl, aralkyl or aryl radicals which can be closed to form a ring, are added to the catalysts of zero valent nickel, with and without donors, the oligomerization of 1,3-diolefins can be controlled so that open-chained oligomers are produced.

The invention relates to a process for the catalytic oligomerization of 1,3-diolefins to form open-chain compounds, characterized in that 1,3-diolefins are reacted in the presence of compounds of zero valent nickel and an excess of amines of the general formula

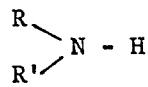

wherein R and R′ are H and/or alkyl, cycloalkyl, aralkyl or aryl radicals, which can be closed to form a ring, with or without other electron donors. Additionally, it has been found that the amine catalysts can be transformed into their alkylene derivatives.

The open-chain oligomers are produced by way of dimerization and trimerization reactions, which are simultaneously accompanied by a transfer or migration, as the case may be, of hydrogen atoms.

The following types of open-chain oligomers of, for example, butadiene, can be produced according to the invention:

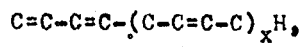

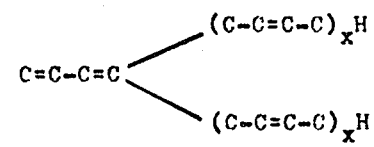

wherein x is a whole number of about 1 to 5.

In the process of the invention, the 1,3-diolefins used are suitably exemplified by isoprene, piperylene and especially butadiene-(1,3). Other 1,3-diolefins can also be used, such as 3-methylheptatriene-(1,4,6), 2,3-dimethylbutadiene-(1,3), hexadiene-(2,4), and octatriene-(1,3,6). Different 1,3-diolefins can also be brought to reaction with one another.

Carbonyl-free compounds of zero valent nickel are preferred catalysts. Aniline, N-methylaniline, morpholine, toluidine or piperidine, for example, can be used as amines in the process of the invention.

In accord with this invention there is used an "excess" of amine. By the term "excess" is meant a quantity of amine which in admixture with the nickel compound will not be bound to the nickel. Thus, it will be seen that, where the nickel compound has electron donors attached thereto in 1 to 4 equivalents with respect to said nickel, it may or may not be possible to bond additional electron donors to the nickel. For example, $\pi$ nickel (O) mono (triphenyl) phosphite is capable of adding three further electron donor equivalents. Amines are generally considered electron donors and so, in the above example, the nickel can have added thereto three equivalents of amine. In this case by excess amine there is meant more than three equivalents. However, in the case of $\pi$ nickel (O) tetra(triphenyl)-phosphite, the nickel cannot add any further electron donor equivalents. Therefore, any amount of amine would be an excess.

It is not known exactly what interaction, if any, there is between the excess amine and the nickel compound. It may be that the excess amine replaces other electron donor equivalents or it may be that the excess amine remains free.

In addition to the oligomerization by which open chain compounds are formed, there also occurs to some extent the cyclization reaction which would be the principal reaction if amines were not added. It is therefore observed that a cocylization of butadiene and the open-chain oligomers that develop according to this process, such as n-octatriene-(1,3,6), takes place:

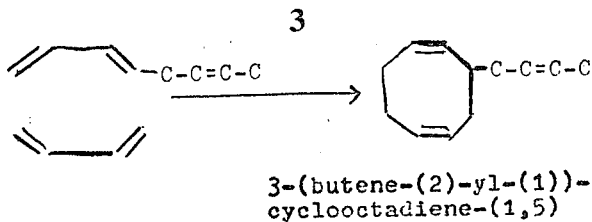

3-(butene-(2)-yl-(1))-cyclooctadiene-(1,5)

The process of the invention can be performed in the presence of solvents, but only of those solvents which do not attack the catalysts or the organometallic components or metal hydrides which are used for the manufacture of the catalysts. Aliphatic or aromatic hydrocarbons or aliphatic or cycloaliphatic ethers are preferred. There is a special advantage, however, in using as solvents the diolefins used in the manufacture of the catalyst or the products which can be manufactured according to the process of the invention, so that no foreign substances will have to be separated from the reaction product. The process can be performed at normal pressure or at overpressure, the pressure range being determined by the desired direction of the reaction and the temperature that is necessary in each case. The process can be performed at temperatures of $-10°$ to $+200°C.$, but preferably at from $20°$ to $120°C.$ The products that can be manufactured according to the invention are valuable materials for further organic syntheses. The products are of especial value as components for the manufacture of so-called terpolymers, i.e., elastomers composed of two monoolefins and a third component which has at least two double bonds.

EXAMPLE 1

4.4 g = 17.1 mmoles of nickel acetyl acetonate and 10.9 g = 17.1 mmoles of tri-(phenyl-phenyl)-phosphite are reduced at 0° to 20°C., in 85 ml of benzene in which about 10 g of butadiene are dissolved, by means of 4.4 g =34 mmoles of monoethoxy diethyl aluminum. 100 g of morpholine are added to the catalyst solution which is then heated to 80°C. with the introduction of butadiene. In the course of 70 minutes of intense agitation a total of 870 g of butadiene is absorbed. All volatile products are then removed by distillation in a vacuum increasing towards the end to $10^{-3}$ to $10^{-4}$ torr, and at a bath temperature of 80°C. The composition of the distillate is determined by gas chromatography. A total of 866.5 g of product is obtained, having the following composition:

84.1 g = 9.7% of n-octatriene
8.7 g = 1.0% of 4-vinylcyclohexene
326.9 g = 37.3% of cyclooctadiene-(1,5)
69 g = 8%  }-of dodecatetraene
109.2 g = 12.6
20.5 g = 2.4% of three unknown hydrocarbons
178.8 g = 20.6% of 3-(butene-(2)-yl-(1))-cyclooctadiene-(1,5)
46.3 g = 5.5% of six unknown hydrocarbons
23 g = 2.7% of higher oligomers.

The n-octatriene can be separated by distillation (B.P.$_{100}$ 72°C.). According to the H$^1$ NMR (nuclear magnetic resonance) and infrared spectra, it is composed very largely of n-octatriene-(1,3, trans-6).

Depending on the experimental conditions, the n-octatriene contains both other cis, trans isomers and the 1,3,7 isomer. With maleic acid anhydride a 1:1 addition product ($C_{12}H_{14}O_3$) is obtained (M.P. 72°-73°C.).

The dodecatetraene fraction consists of three different isomers whose structure has been able to be determined both on the basis of the H$^1$ NMR and infrared spectra and through the formation of addition products with maleic acid anhydride. They are the following compounds:

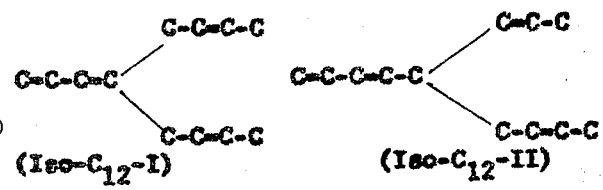

and C=C—C=C—C—C=C—C—C=C—C
(n—C$_{12}$)

The hydrogenation of the isomer mixture yields n-dodecane as well as 5-propylnonene.

The 3-(butene-(2)-yl-(1))-cyclooctadiene-(1,5) was identified by means of a comparative test. When hydrogenated it yields n-butyl-cyclooctane. In the hydrogenation product of the higher hydrocarbons it has been possible to detect n-octyl-cyclooctane and other compounds.

EXAMPLE 2

The catalyst is prepared according to Example 1, but 4.5 g = 17.1 mmoles of triphenylphosphine are used as the electron donor. The reaction is performed under the same conditions and 612 g are obtained of a reaction product having the following composition:

61.2 g = 10% of n-octatriene
4.7 g = 0.8% of 4-vinylcyclohexene
10.0 g = 1.6% of cyclooctadiene-(1,5)
134.6 g = 22.0% } —of dodecatetraenes
185.2 g = 30.2%
32.2 g = 5.3% of cyclododecatriene-(1,5,9)
163 g = 26.6% of C$_{16}$ to C$_{20}$ hydrocarbons
21 g = 3.4% of higher isomers.

The high content of dodecatetraenes is to be explained by the fact that the n-octatriene reacts in turn with butadiene.

EXAMPLE 3

The catalyst is prepared according to Example 2, but in only half the amount, and 40 g of morpholine are added. The catalyst solution is mixed with 900 g of butadiene and the solution is pumped through a reactor consisting of a copper capillary having a reaction capacity of 2 liters and lying in a bath heated to 80°C., the time of stay being 70 minutes. At the end of the capillary is a pressure relief valve set for a discharge pressure of 30 atmospheres. In this manner, 504 g of a reaction product is obtained having the following composition:

285 g = 56.5% n-octatriene
15.1 g = 3.0% 4-vinylcyclohexene
77.6 g = 15.4% cyclooctadiene-(1,5)
3.0 g = 0.6% }—dodecatetraenes
3.0 g = 0.6%
2.4 g = 0.5% 3-(butene-(2)-yl-(1))-cyclooctadiene-(1,5)
102.0 g = 20.2% all-trans-cyclododecatriene-(1,5,9)
6.7 g = 1.3% trans, trans, cis1cyclododecatriene-(1,5,9)
9.5 g = 1.9% higher oligomers The yield of n-octatriene amounts to 96% of the products produced by hydrogen transfer.

EXAMPLE 4

One tenth of the amount of catalyst specified in Example 2 is brought to reaction in liquid butadiene in the autoclave, in such a manner that about 50% of the butadiene is reacted. Under these conditions the yield of n-octatriene rises to more than 60%, while the percentage of the higher oligomers drops to a total of about 30%. With reference to nickel, three times the amount of butadiene is reacted.

EXAMPLE 5

The reaction is performed according to Example 1, but tricyclohexylphosphine is used as the electron donor. With half of the amount of catalyst specified in Example 1, 263 grams of a reaction product of the following composition is obtained in the course of one hour:
- 46.6 g = 17.7% n-octatriene
- 3.7 g = 1.4% 4-vinylcyclohexene
- 2.8 g = 1.1% of an unknown hydrocarbon
- 3.7 g = 1.4% cyclooctadiene-(1,5)
- 55.3 g = 21%  } —dodecatetraenes
- 73.3 g = 27.8%
- 68.0 g = 25.9% $C_{16}$ to $C_{20}$ hydrocarbons
- 10.0 g = 3.8% higher oligomers

EXAMPLE 6

The reaction is performed according to Example 1, but instead of morpholine 100 g of aniline is used as the additive. In the course of 4 hours a reaction product (196.7 g) is obtained at 80°C. having the following composition:
- 2.6 g = 1.3% unknown hydrocarbon
- 30.3 g = 15.4% n-octatriene
- 4.4 g = 2.2% 4-vinylcyclohexene
- 131 g = 66.6% cyclooctadiene-(1,5)
- 3.6 g = 1.8% } —dodecatetraenes
- 3.3 g = 1.7%
- 16.4 g = 8.3% 3-(butene-(2)-yl-(1))-cyclooctadiene-(1,5)
- 5.1 g = 2.6% higher oligomers.

EXAMPLE 7

The reaction is performed according to Example 1, but instead of morpholine as the additive, 100 g of N-methyleniline is used. In the course of 70 minutes one obtains at 80°C. 711 g of a reaction product having the following composition:
- 3.8 g = 0.5% unknown hydrocarbon
- 42.7 g = 6.0% n-octatriene
- 12.4 g = 1.7% 4-vinylcyclohexene
- 423.0 g = 59.5% cyclooctadiene
- 44.3 g = 6.2% } —dodecatetraenes
- 22.4 g = 3.1%
- 125.8 g = 17.7% 3-(butene-(2)-yl-(1))-cyclooctadiene-(1,5)
- 35 g = 4.9% $C_{16}$ to $C_{20}$ hydrocarbons
- 1.3 g = 0.2% higher oligomers.

EXAMPLE 8

10 g = 39 mmoles of nickel acetyl acetonate are reduced with 10.2 g of ethoxydiethyl aluminum in benzene containing about 15 g of butadiene. The catalyst solution is mixed with 50 g of morpholine and about 900 g of butadiene and the solution thus obtained is pumped through the reactor described in Example 3 for 1.5 hours. 804 g of reaction product of the following composition is obtained:
- 57.4 g = 7.1% an unknown hydrocarbon
- 334.0 g = 41.4% n-octatriene
- 23.2 g = 2.9% 4-vinylcyclohexene
- 6.2 g = 0.8% two unknown hydrocarbons
- 9.4 g = 1.2% cyclooctadiene-(1,5)
- 0.6 g = 0.7% dodecatetraenes
- 227.4 g = 28.2% all-trans-cyclododecatriene-(1,5,9)
- 19.2 g = 2.4% trans, trans, cis-cyclododecatriene-(1,5,9)
- 3.0 g = 0.4% trans,cis,cis-cyclododecatriene-(1,5,9)
- 124.0 g = 15.4% higher oligomers.

EXAMPLE 9

Twice the amount of catalyst is prepared according to Example 1, and the catalyst solution is mixed with 100 g of morpholine and 100 g of butadiene. The mixture is allowed to stand for 2 days at 20°C. and it is then distilled. 115 g of reaction product is obtained, having the following composition:
- 2.7 g = 2.3% n-octatriene
- 3.5 g = 3.0% 4-vinylcyclohexene
- 83.5 g = 72.6% cyclooctadiene-(1,5)
- 1.3 g = 1.1% 3-(butene-(2)-yl-(1)-cyclooctadiene-(1,5)
- 0.8 g = 0.7% cyclododecatriene-(1,5,9)
- 23.2 g = 20.2% alkenylmorpholine.

The alkenylmorpholine that is separated becomes transformed in the hydrogenation process to an alkylmorpholine which has been identified by the infrared and mass spectra as n-octylmorpholine (B.P.$_{14}$ 130° to 132°C.)

EXAMPLE 10

17.5 g = 68.2 mmoles of nickel acetyl acetonate are reduced with 17.7 g = 136 mmoles of ethoxydiethyl aluminum in 360 ml of benzene in which about 30 g of butadiene are dissolved. After the addition of 200 g of N-methyl aniline and 200 g of butadiene, the mixture is allowed to stand at 30°C for 2 weeks. 152 g of a reaction product of the following composition is obtained:
- 1.4 g = 1.0% n-octatriene
- 5.8 g = 3.8% 4-vinylcyclohexene
- 3.5 g = 2.3% cyclooctadiene-(1,5)
- 3.0 g = 2.0% dodecatetraene
- 105.8 g = 70.8% cyclododecatriene-(1,5,9)
- 7.6 g = 5.0% $C_{16}$ to $C_{20}$ hydrocarbons
- 24.5 g = 16.1% N-alkenyl-N-methylaniline
- 1.5 g = 1.0% higher oligomers In the hydrogenation process, the N-alkenyl-N-methylaniline is transformed to a product of which 83% consists of a uniform trialkylamine which has been identified with great probability, on the basis of the $H^1$ NMR and infrared spectra, as N-(n-dodecyl)-N-methyl-aniline (B.P.$_{0.1}$: 180° to 185°C.

EXAMPLE 11

Catalyst and conditions of reaction same as Example 2. 171 g of cis-trans and trans-trans n-octatriene-1,3,6 are used. In half an hour 89% of the diene has reacted. After hydrogenation the following is obtained:
- 43.1 g = 29.3% 5-propyl-nonane
- 67.6 g = 46.0% 5,6-dipropyl-decane
- 0.7 g = 0.5% n-hexadecane
- 1.5 g = 1.0% other $C_{16}$ hydrocarbons
- 34.0 g = 23.1% higher alkanes.

EXAMPLE 12

Catalyst (half the amount) and conditions of reaction same as in Example 2. In 4¼ hours 365 6 g of piperylene are added drop by drop. The transformation amounts to 88%. After hydrogenation of the olefins that are formed, the following is obtained.

180.9 g = 56.2% meso and racemic 4,5-dimethyloctane
49.0 g = 15.3% 4-methyl-nonane
Trace = < 0.1% n-decane
66.3 g = 20.6% hydrogenated six-ring and eight-ring dimers of piperylene
25.4 g = 7.9% higher hydrocarbons.

EXAMPLE 13

Catalyst and conditions of reaction as in Example 1. In half an hour 140 g of isoprene are added drop by drop. The transformation amounts to 92% of the theory. The following are obtained:

105.7 g = 82.1% chain dimers of isoprene
0.9 g = 0.7% p-diprene and dipentene
0.9 g = 0.7% dimethylcyclooctadiene
21.1 g = 16.4% higher olefins.

The chain dimers of isoprene can be hydrogenated to form a mixture of 2,6-, 2,7- and 3,6-dimethyloctane.

EXAMPLE 14

Procedure, conditions of reaction and yields same as Example 3, but as catalyst a solution of 2.34 g = 8.5 mmoles of Ni(cyclooctadiene-(1,5)$_2$ and 2.23 g = 8.5 mmoles of triphenylphosphine are used and 40 g of morpholine are added.

EXAMPLE 15

Procedure and catalyst (half the amount) same as in Example 1. However, 40 g of piperidine are added. After one hour of reaction time the following is obtained:

1.7 g = 1.0% 4-vinylcyclohexene
14.9 g = 8.9% n-octatriene
90.6 g = 54.3% cyclooctadiene-(1,5)
23.2 g = 13.8% iso- and n-C$_{12}$-tetraene
27.1 g = 16.1% 3-(butene-(2)-yl-(1))-cyclooctadiene-(1,5)
10.6 g = 6.3% higher olefins.

EXAMPLE 16

Catalyst and procedure as in Example 3. Instead of butadiene, 900 g of a mixture of butadiene and piperylene (weight ratio 2:1) is used. After distillation as usual, the following is obtained:

7.9 g = 1.9% 4-vinylcyclohexene
39.1 g = 9.4% cyclooctadiene-(1,5)
8.1 g = 2.0% four unknown olefins
1.0 g = 0.2% di-methyl-cyclooctadiene-(1,5)(composed of 2 piperylene)
199.7 g = 48.1% n-octatriene
109.3 g = 26.4% methyl-n-octatriene*
14.1 g = 3.4% di-methyl-n-octatriene (composed of 2 piperylene)
28.4 g = 6.8% cyclododecatriene-(1,5,9)
7.3 g = 1.8% higher olefins and residue.

*90% of the isomers of methyl-n-octatriene are hydrogenated to form 4-methyl-octane and the balance to form n-nonane. The transformation to butadiene amounts to about 55%. The yield of methyl-n-octatriene amounts to 82% of the reacted piperylene (transformation approx. 25%).

We claim:

1. A composition comprising at least one carbonyl free zero-valent nickel complex compound having 1 to 4 electron donor constituents selected from the group consisting of compounds containing non-benzenoid carbon-carbon unsaturation, alkyl phosphites, aryl phosphites, alkyl phosphines and aryl phosphines, and morpholine or an amine of the formula

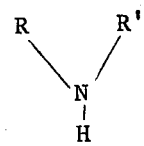

wherein R is cycloalkyl or aryl, R' is hydrogen, alkyl, cycloalkyl or aryl or R and R' taken together form an alkylene group which, together with said N form a closed ring, wherein said amine is present in said composition in a proportion in excess of any amine bondable to said nickel in said zero-valent complex, said composition containing free amine.

2. Composition as claimed in claim 1, wherein said amine is morpholine.

3. Composition as claimed in claim 1, wherein said nickel compound is a π compound between said nickel and at least one electron donor.

4. A composition according to claim 1 wherein said amine is selected from the group consisting of aniline, N-methylaniline, morpholine, toluidine and piperidine.

* * * * *